United States Patent [19]
Paton et al.

[11] Patent Number: 4,606,442
[45] Date of Patent: Aug. 19, 1986

[54] FRICTIONAL DAMPING ASSEMBLY FOR SUSPENSION STRUT

[75] Inventors: H. Neil Paton, 2521 W. Montlake Pl. East, Seattle, Wash. 98112; Frank F. Smith, Seattle, Wash.

[73] Assignees: H. Neil Paton; John B. Skilling, both of Seattle, Wash.

[21] Appl. No.: 675,618

[22] Filed: Nov. 28, 1984

[51] Int. Cl.⁴ .............................................. F16F 11/00
[52] U.S. Cl. ...................................... 188/381; 188/67; 188/129; 188/271; 267/9 C; 267/134; 403/369
[58] Field of Search ................ 188/67, 381, 129, 271, 188/321.11, 322.11, 322.17–322.19; 403/369, 374; 267/9 R, 9 B, 9 A, 9 C, 64.19, 8 R, 134, 33, 135, 34, 140.1, 35; 280/668; 277/117–122, 116.2, 190–191; 213/22–31, 32 A, 11, 36, 37–39; 248/562

[56] References Cited

U.S. PATENT DOCUMENTS

| | | | |
|---|---|---|---|
| 2,426,661 | 9/1947 | Anderson | 267/9 C X |
| 2,574,788 | 11/1951 | Janeway et al. | 267/9 C |
| 2,747,696 | 5/1956 | Blattner | 188/129 |
| 2,752,149 | 6/1956 | Forcellini | 267/9 C |
| 2,753,177 | 7/1956 | Boyd | 267/9 C |
| 2,844,366 | 7/1958 | Butterfield | 188/129 X |
| 3,054,478 | 9/1962 | Rumsey | 188/129 X |
| 4,415,146 | 11/1983 | Sitko | 267/9 C |
| 4,473,216 | 9/1984 | Paton et al. | 267/9 C |
| 4,475,722 | 10/1984 | Paton et al. | 267/9 C |

*Primary Examiner*—Douglas C. Butler
*Attorney, Agent, or Firm*—Finnegan, Henderson, Farabow, Garrett & Dunner

[57] ABSTRACT

The assembly includes three damper shoes that are guided by and wedged transversely between two wedge rings, one having three curved flats and the other having three planar flats that respectively contact conforming contact surfaces of the damper shoes. The assembly is particularly useful in a frictionally damped suspension strut.

2 Claims, 5 Drawing Figures

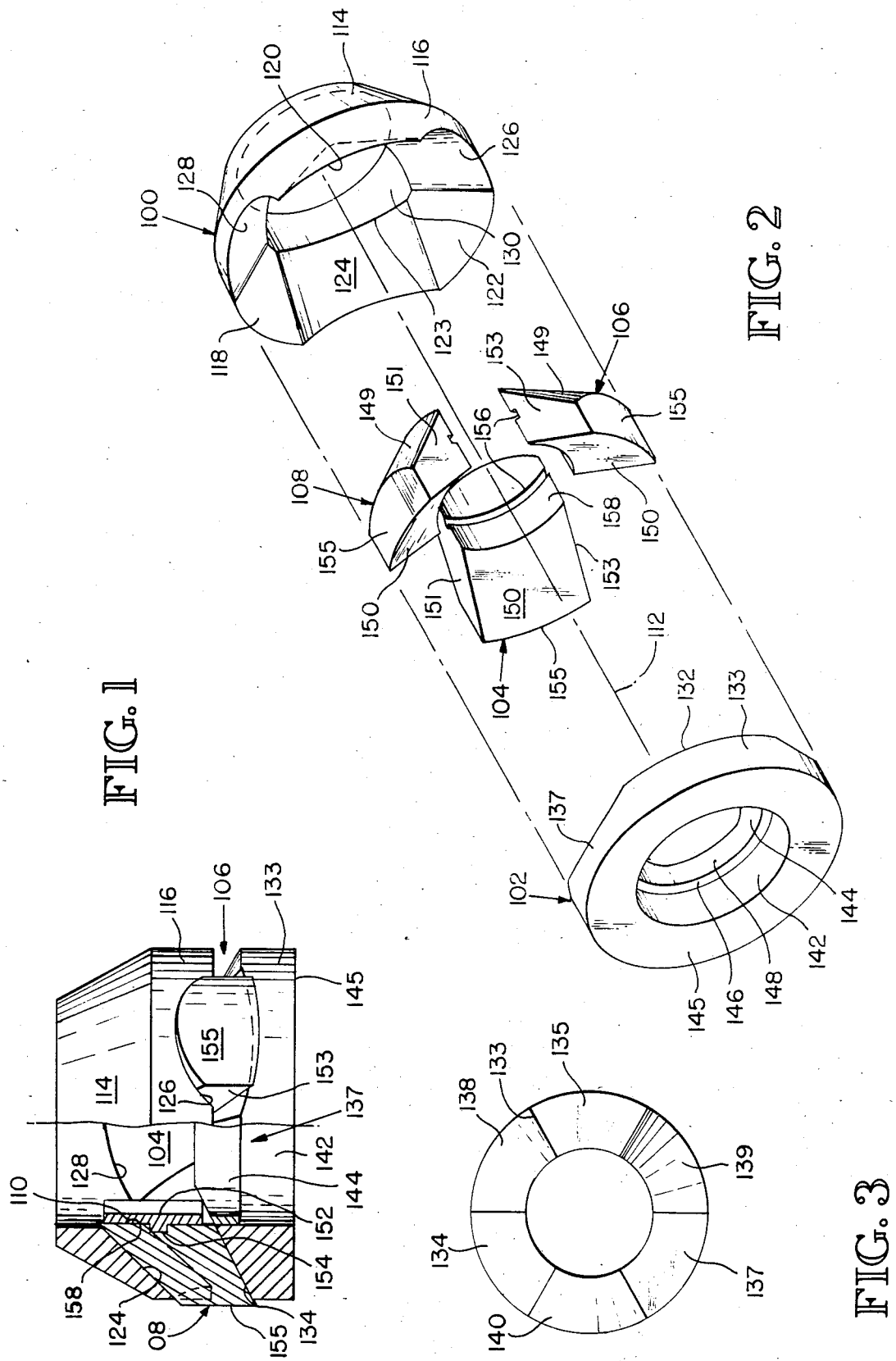

FRICTIONAL DAMPING ASSEMBLY FOR SUSPENSION STRUT

BACKGROUND OF THE INVENTION

This invention relates to damping apparatus and, more particularly, to frictional damping apparatus. While one presently preferred embodiment of the invention is disclosed herein for application to suspension struts such as those used as front and/or rear suspensions of light weight passenger vehicles, the invention is not limited to such applications and may be used with other types of suspensions and vehicles and in other applications.

A promising frictionally damped suspension strut that includes a frictional damping assembly of this type is disclosed in copending application Ser. No. 587,520, filed Mar. 8, 1984. This invention is an improvement of this damping assembly.

SUMMARY OF THE INVENTION

An object of this invention is to provide an improved frictional damping assembly.

Another object of this invention is to provide an improved frictional damping assembly having fewer parts.

Another object of this invention related to that just stated is to provide an improved frictional damping assembly having fewer frictional wear elements.

Another object of this invention is to provide an improved frictional damping assembly that is unaffected by rotative movement of a telescoping load bearing assembly.

Still another object of this invention is to provide an improved frictional damping assembly in which the frictional wear elements, or the frictional force control elements, or both, are easily replaceable.

To achieve these objects in accordance with the principles of this invention, this invention provides frictional damping apparatus comprised of two spaced wedge rings and a plurality of frictional damping elements between them. One of these wedge rings has a generally conical concave portion forming a plurality of spaced apart recessed flats that preferably are, but need not be, curved. The other wedge ring has a generally conical convex portion forming a like number of spaced apart flats that preferably are planar, but could be curved also. The damping elements are respectively guided and wedged inwardly between opposed pairs of these flats. This apparatus is especially suited for, but is not limited to, use as a frictional damping assembly in a frictionally damped suspension strut, preferably one in which the main load bearing spring force operates the damping assembly.

With the curved flat construction of this invention, it is possible to use fewer frictional wear elements than what would otherwise be required using an entirely planar flat construction. For example, in the frictionally damped suspension strut disclosed in the aforesaid Ser. No. 587,520, filed Mar. 8, 1984, five damper wedges are used.

According to this invention, the number of damper wedges could be reduced to only three, while obtaining essentially the same damping effects.

These and other features, objects and advantages of the present invention will become apparent from the detailed description and claims to follow, taken in conjunction with the accompanying drawings in which like parts bear like reference numerals.

BRIEF DESCRIPTION OF THE DRAWINGS

FIG. 1 is a perspective view, partially in longitudinal section, of one presently preferred embodiment of the frictional damping assembly of this invention;

FIG. 2 is an exploded view of the FIG. 1 assembly, depicting the damper wedges without damper shoes;

FIG. 3 is a top plan view of the wedge ring having planar flats of the FIG. 1 assembly;

DETAILED DESCRIPTION OF THE DRAWINGS

Figure 4:
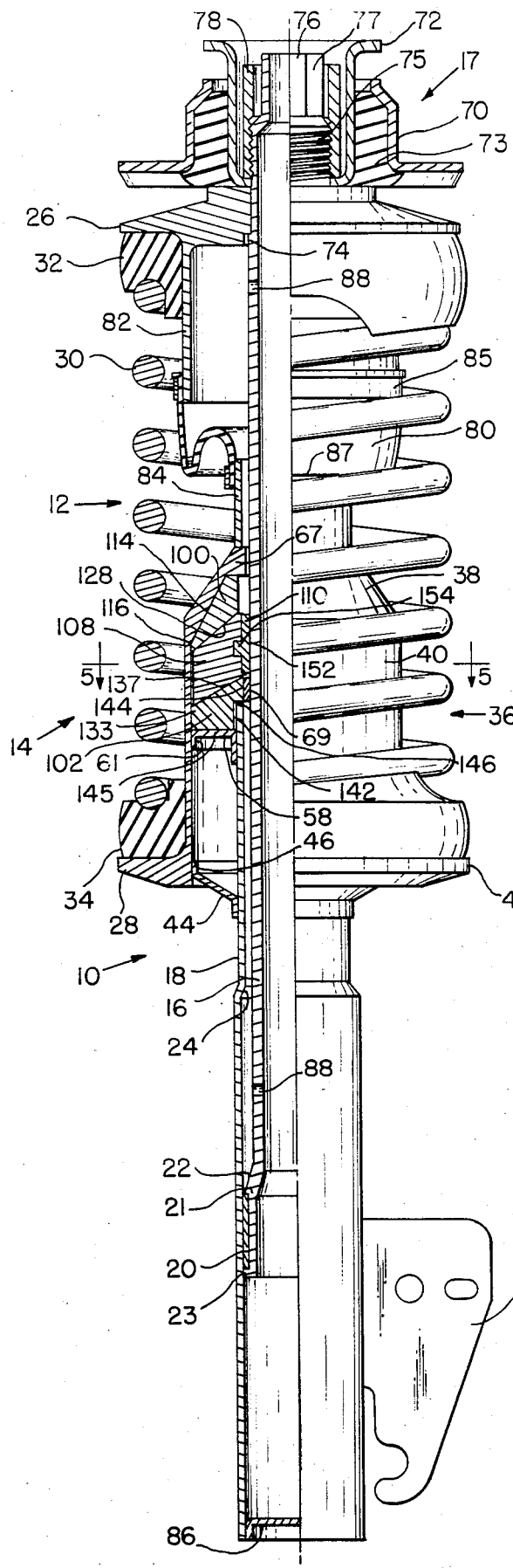
FIG. 4 is a perspective view, partially in longitudinal section, of a suspension strut including the FIG. 1 assembly.
Figure 5:
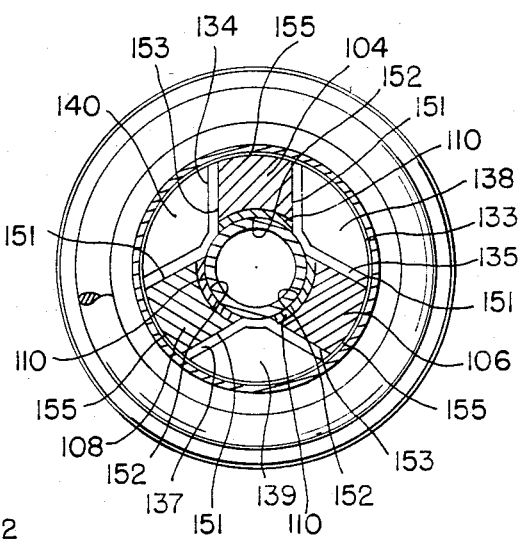
FIG. 5 is a section taken along the line 5—5 in FIG. 4.

Referring first to FIGS. 1-3, one presently preferred embodiment of the frictional damping assembly of this invention includes two wedge rings 100 and 102 and three damper wedges 104, 106 and 108. Each wedge mounts a damper shoe 110. The damping assembly is operative to apply a frictional drag force to a cylindrical member (not shown), extending coaxially through rings 100 and 102 along axis 112. This drag force resists reciprocative movement of the member in proportion to the compression force exerted between rings 100 and 102. One preferred manner in which this force is applied will be described presently with reference to application of the FIG. 1 assembly to a frictionally damped suspension strut, as illustrated in FIGS. 4 and 5.

Still referring to FIGS. 1-3, wedge ring 100 includes an outer surface made up of a conical portion 114 and a cylindrical portion 116. Portion 114 acts as an axial load bearing surface, as will be described presently. The inner surface of ring 100 includes a generally conical concave portion 123 surrounding a cylindrical bore 130. The concave portion includes three curved flats 124, 126 and 128 separated by three conical sections 118, 120 and 122 that coincide with a common conical surface of revolution. In the example, flats 124, 126 and 128 are individually ground out of a continuous conical surface, leaving sections 118, 120 and 122 in tact, although other known fabrication techniques may be used.

Flats 124, 126 and 128 are so constructed and arranged with respect to the internal and external diameters of ring 100 that their inner ends front upon bore 130 without intersecting one another. Consequently, by limiting the widths of wedges 104, 106 and 108, measured concentrically with respect to axis 112, to the widths of portions 124, 126 and 128, the inner edges of each wedge and its associated shoe 110 will not interfere with those of the adjacent wedges and shoes when in contact with the member being damped, provided the profile of the member being damped registers with the outline of bore 130 at close clearance. Since flats 124, 126 and 128 are curved instead of planar, their widths may be greater than would otherwise be possible with the use of planar flats in the same or similar construction. It is thus possible to obtain comparable frictional damping effects through use of only three damper wedges with these curved flats, instead of the four, five or more that would otherwise be required with planar flats for the same or essentially the same bore diameter. It will be recognized that flats 124, 126 and 128 could be V-shaped, have multiple planar faces or be of other suitable recessed cross-sections, and therefore the curved cross-section illustrated is merely illustrative, not limiting.

Wedge ring 102 includes an outer surface made up of a generally conical convex portion 132 and a cylindrical portion 133. The concave portion includes three planar flats 134, 135 and 137 that are spaced apart and coaxially alignable, respectively, in face-to-face relation with flats 124, 126 and 128, as shown (FIG. 2). The slope of flats 134, 135 and 137, however, is less than that of flats 124, 126 and 128 so that they diverge in an inward radial direction for purposes to be described presently. Flats 134, 135 and 137 are separated by three conical sections 138, 139 and 140 that coincide with a common conical surface of revolution. This is similar to but is of less slope than the surface of revolution that coincides with sections 118, 120 and 122 to provide sufficient axial clearance between them. The inner surface of ring 102 includes two cylindrical portions 142 and 144 and an intervening annular shoulder 146. The bore 148 bounded by portion 144 has an outline that corresponds to the outline of bore 130. The outer end of ring 102 forms a transverse annular surface 145 that acts as a load bearing surface, as will be described presently.

Each of the damper wedges 104, 106 and 108 includes a curved contact surface 149 and an opposed planar contact surface 150 that conform in outline and slope, respectively, with the curved and planar flats formed by wedge rings 100 and 102. These contact surfaces are engageable with the flats in face-to-face sliding contact and are guided by them for radial movement. A suitable low friction material may be formed at these interfaces to promote such movement with minimal friction. Each damper wedge further includes two parallel side surfaces 151 and 153 and a curved exterior surface 155.

Each damper shoe 110 has a wear face 152 that is curved in conformance with outline of the member being damped. The opposite face of shoe 110 includes an upstanding rib 154 (FIG. 1) that registers with a slot 156 (FIG. 2) formed in the anterior surface 158 of each damper wedge. The shoe may be secured to surface 158 by suitable adhesive bonding with rib 154 inserted within slot 156. Rib 154 thus serves to align and maintain the shoe in position with respect to face 158. The shoe may be formulated of any suitable low friction material, preferably a material having a coefficient of static friction that is less than its coefficient of dynamic friction.

Due to the radial divergence of the flats formed by rings 100 and 102, wedges 104, 106 and 108 are urged inwardly in unison in response to application of axial compression force that urges rings 100 and 102 together. This of course results in the creation of a radial force component that appears as a radial or transverse normal force on the damper shoes 110. Consequently, the drag force obtained as a result of the damper shoes being pressed against the member being damped is proportional to the axial compressive force on the wedge rings.

Referring now to FIGS. 4 and 5, a suspension strut especially suited for use with the FIG. 1 damping assembly comprises a telescoping load bearing assembly (generally referenced by numeral 10) that extends through an elastomerically damped coil spring assembly (generally referenced by numeral 12) and the FIG. 1 damping assembly (generally referenced by numeral 14). The spring assembly 12 and the damping assembly 14 respectively provide resilient load bearing support for and dampen telescopic movement of the load bearing assembly 10. The damping assembly 14 is operated by the spring assembly 12. With this construction, the ride frequency obtained (i.e., the frequency at which the body or sprung mass oscillates with respect to the wheel) remains substantially constant within a predetermined load range. As the front and/or rear suspension of a light weight passenger vehicle, this load range may be selected so that it corresponds to the optimum load range of the vehicle.

The load bearing assembly 10 includes two telescopically movable tubular members, an inner member 16 and an outer member 18, adapted to extend and contract reciprocatively from a design position (FIG. 4) toward an extended rebound position and a contracted jounce position, respectively. The inner ends of these members are telescopically movable a distance related to the lengths of the rebound and jounce strokes of the load bearing assembly. The outer ends of these members are adapted to be secured to a vehicle; in the example, the outer end of member 16 is adapted to be secured to a vehicle body (not shown) by mounting assembly 17 and the outer end of member 18 is adapted to be secured to a vehicle steering arm or knuckle (not shown) by mounting assembly 19.

Two spaced apart bearing means act between the members 16 and 18 to promote telescoping movement of them, and are spaced apart axially a distance sufficient to minimize the effects of bending loads. In the example illustrated in FIG. 4, these bearing means are provided in the form of a sleeve bearing 20 mounted by the inner end of member 16 and damper shoes 110 located adjacent the inner end of member 18. (The shoes 110 also serve as part of the damping assembly 14, as already described.) The inner end portion of member 16 underlying bearing 20 is of enlarged diameter that registers with the diameter of the outer end portion of member 18 for a distance corresponding to the rebound stroke of assembly 10. Rebound stops 22 and 24 are formed by the closures of these enlarged diameter portions. These stops engage one another at the rebound position of the load bearing assembly 10 to prevent it from over-extending. Bearing 20 is held in position within a recess formed between two spaced apart shoulders 21 and 23. In the example, bearing 20 is composed of the same material as shoes 110.

The FIG. 3 spring assembly 12 acts between member 16 and the damping assembly 14. It is compressed axially between a first spring support 26 mounted by the outer end of member 16 and a second spring support 28 formed by the damping assembly 14, in response to an axially applied load on the strut. The spring assembly 12 includes a coil spring 30 and two annular elastomeric pads 32 and 34 respectively mounting the ends of spring 30 on supports 26 and 28. The assembly provides a nonlinear spring curve; that is, the spring rate is not constant throughout the entire range of spring deflections. The assembly also includes viscous damping derived from the elastomeric pads 32 and 34. These pads act as viscous damping elements in response to so-called "tar-strip" or other pulse-like or high frequency load conditions to which the damping assembly 14 has relatively low response sensitivity. The amount of viscous damping required, however, will be dependent upon the degree of nonlinearity in the spring curve, and hence stiffness of, the spring assembly under such load conditions. Thus, while preferably both ends of the spring are supported by elastomeric pads, as shown (FIG. 3), only one end could be so supported or elastomer could be otherwise included in the spring assembly, provided sufficient viscous damping is obtained. Accordingly, the construction and arrangement shown is illustrative and not limiting.

The damping assembly 14 is made up of an inverted bell-shaped spring carrier 36 that includes a generally conical portion 38 and a generally tubular portion 40 that terminates in a transverse annular flange portion 42. This flange portion forms spring support 28. An annular flange 44 is secured to and projects transversely from the outer surface of member 18, and terminates in a cylindrical portion 46 that underlies and supports portion 42. Flange 44 encloses the lower end of carrier 36 to prevent or minimize entrance of dirt and other contaminants into the interior of the damping assembly 14. A low friction bearing surface is formed along the outer face of portion 46 to provide low friction sliding contact with the interior surface of portion 42. Any suitable low friction material may be applied to the outer face of portion 46 to form this surface.

FIG. 1 damping assembly is enclosed by carrier 36 with wedge rings 100 and 102 respectively supported between and receiving axial compression forces from portion 38 and a flange 58 that is secured to and projects transversely from member 18, as shown (FIG. 4). In this application, of course, the damped member described with reference to FIGS. 1–3 corresponds to member 16. The wear face 152 (FIG. 1) of each shoe 110 registers with the outline of the outer surface of member 16. When the shoes are urged into face-to-face contact with the outer surface of member 16, a frictional drag force is applied to member 16, resisting extension or contraction of the load bearing assembly.

When the strut is used as a front suspension for light weight passenger vehicles, member 18 may shift rotatively about member 16 in response to turning input to the steering arm or knuckle. In this and other applications in which rotative shifting of member 18 occurs, it is desirable to isolate the damper wedges from the effects of this shifting. Accordingly, it presently is preferred to allow the wedge ring 102 to "float" with respect to member 18. Shoulder 146 overlaps and positions ring 102 in axial alignment with the inner end of member 18. Ring 102 has a cross-sectional outline that registers with but is closely spaced from member 16 and portion 40 at surfaces 148 and 133, respectively. Consequently, there is either low friction or no contact between ring 102 and portion 40 or members 16 and 18 at any of these locations, except incidental to positioning ring 102 in coaxial alignment with the inner end of member 18, as shown (FIG. 4). Flange 58 underlies and provides axial support to ring 102 at surface 145 (FIG. 2) so as to maintain ring 102 in a fixed axial position and hence in load transmitting relation with member 18, as will be described presently. Flange 58 terminates in a cylindrical portion 61 that underlies and supports portion 40. As is the case of portion 46, a low friction bearing surface is formed along the outer face of portion 61.

The interface between surface 145 and flange 58 acts to prevent or substantially eliminate transmission of all but axial loads from member 18 to ring 102. Low friction bearing surfaces generally similar to those formed at portions 46 and 61 are formed along surfaces 142 and 145 and the opposed exterior surface of member. These surfaces promote low friction sliding movement at these interfaces, and thereby eliminate or minimize transmission of sheer forces between ring 102, member 18 and portion 40. Consequently, ring 102 is isolated from most if not all of the effects of nonaxial forces that appear at the inner end of member 18.

If the angles of inclination of the wedge ring flats with respect to the longitudinal strut axis are sufficiently great, the damper wedges may have a tendency to rock slightly during extension and contraction of the load bearing assembly. Since the shoes 110 in the illustrated example also act as one bearing for the load bearing assembly, this rocking motion could cause the end of portion 38 to shift transversely into contact with member 16. To prevent this, a secondary bearing 67 may be mounted at the end of poriton 38.

This bearing is generally similar to bearing 20 but is of such reduced thickness that it does not contact member 16 except when the damper wedges are out of their normal positions illustrated. A similar bearing 69 may be mounted between surface 144 to accomplish the same end.

The damper wedges 104, 106 and 108 are urged inwardly by the wedging action produced between wedge rings 100 and 102 in response to the axial force produced by carrier 36 being drawn toward the outer end of member 18. This is of course the result of the axial force generated by spring assembly 12 being compressed between supports 26 and 28 in response to an axially directed load on the strut. The damper wedges are thus urged inwardly in unison, and produce an aggregate drag force that is proportional to the axial load applied to the strut. This drag force is controllable in accordance with the angles of inclination of the wedge ring flats with respect to the longitudinal strut axis, or the coefficients of friction of the material forming the flats, or both. The drag force may even be controlled so that it varies depending upon whether the strut is being subjected to jounce or rebound conditions. For many light weight passenger vehicle applications, for example, the drag force preferably is greater during rebound conditions than jounce conditions. One way to accomplish this is to vary the angles of inclination of the flats as illustrated in FIG. 1, so that planar flats formed by ring 102 are disposed at a greater inclination to the longitudinal strut axis than the curved flats formed by ring 100. This may be accomplished simply by disassembling the strut, as will be described presently, removing carrier 36 and then replacing one or both wedge rings 100 or 102, along with compatible damper wedges.

As the damper shoes 110 gradually wear away during use, the damper wedges are urged further inward. This compensates for the effects of wear so that the aggregate drag force obtained remains essentially constant, and further provides a discernable indication of shoe wear based upon the degree of inward wedge shift over the anticipated service life of the damper shoes. The damper shoes may be replaced when the wear exceeds acceptable levels by disassembling the strut, as will be described presently, removing carrier 36, and then replacing the existing damper wedges and worn shoes with fresh ones. This replacement may be effected on a periodic basis or when indicated by a sensor responsive to inward wedge shift.

Still referring to FIG. 1, the body mounting assembly 17 includes a tubular collar 70 that is surrounded by a flanged housing 72. These are of conventional design and are compatible with the body mounts customarily used for MacPherson struts. The space between the collar 70 and housing 72 is filled with elastomer 73 or other shock absorber material. The outer end portion of member 16 includes an annular shoulder 74 that is engageable with support 26, with member 16 extending through a central bore formed in support 26. The outer end portion of member 16 is threaded externally at 75 and terminates in an outer end 76 that includes flats 77 or is otherwise shaped to be engageable with an appropriate holding tool. Member 16 is secured in the position illustrated in FIG. 1 by a threaded sleeve 78 that is threaded onto member 16 and, when tightened, causes shoulder 74 to engage and be pulled against support 26. Thus, the load bearing assembly may be disassembled simply by loosening and removing sleeve 78, and then withdrawing the outer end of member 16 from collar 70.

In the assembled position illustrated, end 76 projects outwardly beyond the end of sleeve 78 when sleeve 78 is fully tightened. This allows end 76 to be held against rotation by a holding tool when the strut is being mounted on or dismounted from a vehicle.

In most practical applications, it may be necessary or desirable to prevent dirt and other material from accumulating upon the exposed surface of member 16, at least in those areas that are subjected to frictional drag forces. To this end, a flexible boot 80 may be mounted between support 26 and housing 36. In the example, support 26 includes a cylindrical skirt portion 82 that supports the outer end of boot 80. A cylindrical member 84 projects axially from portion 38 and supports the inner end of boot 80. Appropriate mounting bands 85 and 87 secure the ends of boot 80 to portion 82 and member 84, respectively. As will be appreciated, wiper seals or other known means of removing dirt or other material from the exposed surface of member 16 could be used in place of boot 80.

The FIG. 1 strut may be air cooled to minimize the effects, if any, of frictional heating. The outer end of member 16 is open, and admits air to the interior of the load bearing assembly 10. The outer end of member 18 is closed by a disc-like member 86. One or more air holes 88 allow air from the interior of member 16 to enter into and exit from the space bounded by carrier 36 and boot 80. Air also may enter into and exit from carrier 36 at 46, since that interface is not air tight. This flow of air is dependent in part by the frequency at which the strut is operated, since the load bearing assembly tends to act as an air pump as it extends and contracts. In addition to causing cool air to be moved past the damper wedges, this air flow tends to equalize the pressure within boot 80 with ambient pressure and, hence, prevents boot 80 from over expanding.

While one presently preferred embodiment of this invention has been illustrated and described herein, variations will become apparent to one of ordinary skill in the art. Accordingly, the invention is not to be limited to the particular embodiment illustrated and described herein, and the true scope and spirit of the present invention are to be determined by reference to the appended claims.

The embodiments of the invention in which an exclusive property or privilege is claimed are defined as follows:

1. An improved frictional damping assembly suitable for use with a suspension strut, comprising: two spaced apart wedge rings and a plurality of damper wedges engaged between said wedge rings such that axial compression between said wedge rings will cause said damper wedges to move inwardly in generally radial directions with respect to a bore which extends through said wedge rings; each of said damper wedges having an anterior surface which fronts upon said bore, and which is bounded by two parallel side surfaces and two opposed wedge ring contact surfaces; at least one of said wedge ring contact protruding outwardly into and conforming to a radial groove formed by one of said wedge rings so that said anterior surface has two portions, a first portion bounded by said side surfaces and a second portion bounded by said one wedge ring contact surface, whereby the aggregate area of said anterior surfaces is equal to the the areas of said first portions together with the areas of said second portions.

2. The damping assembly of claim 1, wherein said one wedge ring contact surface is curved.

* * * * *

UNITED STATES PATENT AND TRADEMARK OFFICE
CERTIFICATE OF CORRECTION

PATENT NO. : 4,606,442

DATED : August 19, 1986

INVENTOR(S) : PATON ET AL.

It is certified that error appears in the above-identified patent and that said Letters Patent is hereby corrected as shown below:

In claim 1, line 12, --surfaces-- should be inserted after "contact."

Signed and Sealed this
Thirtieth Day of December, 1986

*Attest:*

DONALD J. QUIGG

*Attesting Officer*     *Commissioner of Patents and Trademarks*